US012624642B2

(12) United States Patent
Miller et al.

(10) Patent No.: US 12,624,642 B2
(45) Date of Patent: May 12, 2026

(54) LOW-PRESSURE TURBINE

(71) Applicant: General Electric Company, Schenectady, NY (US)

(72) Inventors: Brandon W. Miller, Middletown, OH (US); Arda Unsal, Umraniye (TR); Paul Pezzi, Cincinnati, OH (US)

(73) Assignee: GENERAL ELECTRIC COMPANY, Evendale, OH (US)

( * ) Notice: Subject to any disclaimer, the term of this patent is extended or adjusted under 35 U.S.C. 154(b) by 92 days.

(21) Appl. No.: 18/169,328

(22) Filed: Feb. 15, 2023

(65) Prior Publication Data

US 2024/0271542 A1 Aug. 15, 2024

(51) Int. Cl.

| | |
|---|---|
| ***F01D 11/00*** | (2006.01) |
| ***F01D 5/08*** | (2006.01) |
| ***F01D 11/08*** | (2006.01) |

(52) U.S. Cl.

CPC ............ *F01D 11/001* (2013.01); *F01D 5/085* (2013.01); *F01D 11/08* (2013.01); *F05D 2220/30* (2013.01); *F05D 2220/32* (2013.01); *F05D 2240/55* (2013.01)

(58) Field of Classification Search

CPC .......... F01D 11/08; F01D 5/066; F01D 5/085; F01D 11/001; F01D 11/00; F05D 2240/55

See application file for complete search history.

(56) References Cited

U.S. PATENT DOCUMENTS

| | | | | |
|---|---|---|---|---|
| 3,343,806 | A * | 9/1967 | Bobo | F01D 5/3007 415/117 |
| 4,088,422 | A * | 5/1978 | Martin | F01D 11/025 416/198 A |
| 5,232,339 | A * | 8/1993 | Plemmons | F01D 5/084 416/198 A |
| 5,357,744 | A | 10/1994 | Czachor et al. | |
| 6,361,277 | B1 * | 3/2002 | Bulman | F01D 5/082 416/198 A |
| 8,382,432 | B2 * | 2/2013 | Grissino | F01D 11/001 415/199.5 |
| 10,260,365 | B2 | 4/2019 | Wilber | |
| 10,774,668 | B2 * | 9/2020 | Wesling | F01D 11/08 |
| 11,002,143 | B2 | 5/2021 | Vetters et al. | |
| 11,466,590 | B1 | 10/2022 | St-Laurent | |
| 2010/0178160 | A1 * | 7/2010 | Liotta | F01D 11/006 415/173.7 |

(Continued)

FOREIGN PATENT DOCUMENTS

| | | | |
|---|---|---|---|
| EP | 3099903 | B1 | 4/2020 |
| FR | 3097596 | B1 | 7/2021 |

(Continued)

*Primary Examiner* — Eldon T Brockman

(74) *Attorney, Agent, or Firm* — Venable LLP; Peter T. Hrubiec; Michele V. Frank

(57) ABSTRACT

A low-pressure (LP) turbine includes an LP shaft, one or more stages of LP turbine stator vanes and LP turbine rotor blades, and one or more interstage seals. The LP turbine rotor blades are coupled to, and rotate with, the LP shaft. The one or more interstage seals are disposed between the one or more stages. The one or more interstage seals each includes a seal disk that extends radially inward of the LP turbine stator vanes. Each seal disk includes an outer shell that supports one or more seal teeth, and the outer shell rotates as the LP shaft rotates.

20 Claims, 3 Drawing Sheets

(56) References Cited

U.S. PATENT DOCUMENTS

| | | | | |
|---|---|---|---|---|
| 2011/0305560 | A1* | 12/2011 | Belmonte | F01D 5/082 415/178 |
| 2014/0196472 | A1* | 7/2014 | Kupratis | F02C 7/32 60/805 |
| 2019/0085712 | A1* | 3/2019 | Wesling | F01D 11/001 |

FOREIGN PATENT DOCUMENTS

| | | | |
|---|---|---|---|
| FR | 3127269 | A1 | 3/2023 |
| FR | 3130896 | A1 | 6/2023 |
| FR | 3130897 | A1 | 6/2023 |
| FR | 3133367 | A1 | 9/2023 |
| FR | 3133368 | A1 | 9/2023 |
| RU | 2684355 | C1 | 4/2019 |
| WO | 2015105654 | A1 | 7/2015 |
| WO | 2022018385 | A1 | 1/2022 |

* cited by examiner

LOW-PRESSURE TURBINE

TECHNICAL FIELD

The present disclosure relates generally to low-pressure turbines, for example, in turbine engines.

BACKGROUND

A turbine engine generally includes a fan and a turbine section arranged in flow communication with one another. The turbine section can include a low-pressure turbine. The turbine engine includes a gearbox assembly that couples the fan to the turbine section.

BRIEF DESCRIPTION OF THE DRAWINGS

The foregoing and other features and advantages will be apparent from the following, more particular, description of various exemplary embodiments, as illustrated in the accompanying drawings, wherein like reference numbers generally indicate identical, functionally similar, and/or structurally similar elements.

DETAILED DESCRIPTION

Figure 1:
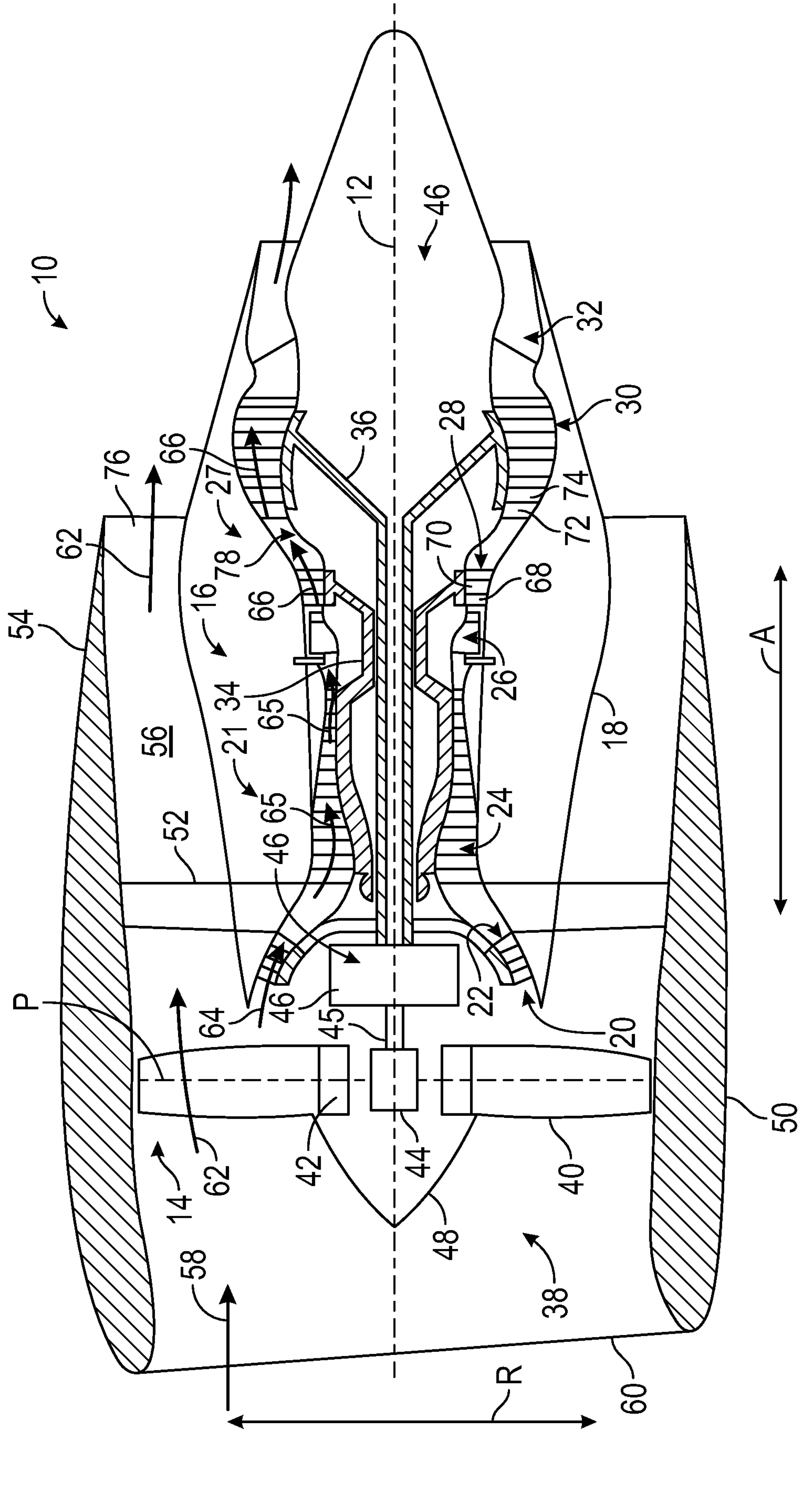
FIG. 1 is a schematic cross-sectional diagram of a turbine engine, taken along a longitudinal centerline axis of the turbine engine, according to the present disclosure.

Additional features, advantages, and embodiments of the present disclosure are set forth or apparent from a consideration of the following detailed description, drawings, and claims. Moreover, both the foregoing summary of the present disclosure and the following detailed description are exemplary and intended to provide further explanation without limiting the scope of the disclosure as claimed.

Various embodiments of the present disclosure are discussed in detail below. While specific embodiments are discussed, this is done for illustration purposes only. A person skilled in the relevant art will recognize that other components and configurations may be used without departing from the spirit and the scope of the present disclosure.

As used herein, the terms "first," "second," and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "forward" and "aft" refer to relative positions within a turbine engine or vehicle, and refer to the normal operational attitude of the turbine engine or vehicle. For example, with regard to a turbine engine, forward refers to a position closer to an engine inlet and aft refers to a position closer to an engine nozzle or exhaust.

As used herein, the terms "low," and "high," or their respective comparative degrees (e.g., "lower" and "higher", where applicable), when used with compressor, turbine, shaft, fan, or turbine engine components, each refers to relative pressures, relative speeds, relative temperatures, and/or relative power outputs within an engine unless otherwise specified. For example, a "low speed" LP shaft is configured to rotate at a speed lower than a "high speed" LP shaft. The terms "low" or "high" in such aforementioned terms may additionally, or alternatively, be understood as relative to minimum allowable speeds, pressures, or temperatures, or minimum or maximum allowable speeds, pressures, or temperatures relative to normal, desired, steady state, etc., operation of the engine.

The terms "coupled," "fixed," "attached," "connected," and the like, refer to both direct coupling, fixing, attaching, or connecting, as well as indirect coupling, fixing, attaching, or connecting through one or more intermediate components or features, unless otherwise specified herein.

The singular forms "a," "an," and "the" include plural references unless the context clearly dictates otherwise.

As used herein, the terms "axial" and "axially" refer to directions and orientations that extend substantially parallel to a centerline of the turbine engine. Moreover, the terms "radial" and "radially" refer to directions and orientations that extend substantially perpendicular to the centerline of the turbine engine. In addition, as used herein, the terms "circumferential" and "circumferentially" refer to directions and orientations that extend arcuately about the centerline of the turbine engine.

Approximating language, as used herein throughout the specification and claims, is applied to modify any quantitative representation that could permissibly vary without resulting in a change in the basic function to which it is related. Accordingly, a value modified by a term or terms, such as "about," "approximately," "generally," "nearly," and "substantially" is not to be limited to the precise value specified. In at least some instances, the approximating language may correspond to the precision of an instrument for measuring the value, or the precision of the methods or the machines for constructing the components and/or the systems or manufacturing the components and/or the systems. For example, the approximating language may refer to being within a one, two, four, ten, fifteen, or twenty percent margin in either individual values, range(s) of values and/or endpoints defining range(s) of values.

The present disclosure provides for an indirect drive low-pressure (LP) turbine for a turbine engine. In indirect drive LP turbines, the fan of the turbine engine is coupled to, and is driven by, the LP turbine through a gearbox assembly, also referred to as a power gearbox. The gearbox assembly is a reduction gearbox that reduces a speed of an output shaft (e.g., a fan shaft of the fan) with respect to an input shaft (e.g., an LP shaft of the LP turbine). Indirect drive LP turbines differ from direct drive LP turbines in that the fan is directly coupled to the LP turbine in a direct drive LP turbine such that there is no reduction of the fan speed with respect to the LP turbine speed. In this way, indirect drive LP turbines allow for faster speeds of the LP shaft as compared to direct drive LP turbines.

The LP turbine includes one or more stages of LP turbine stator vanes and LP turbine rotor blades. The stages of the LP turbine are connected by one or more rotor arms that transmit torque between the stages to the LP shaft, and subsequently to the gearbox assembly. The one more rotor arms are referred to as an inner shell. The LP turbine also includes an outer shell that is located radially outward of the inner shell. The outer shell is part of an interstage seal and defines a rotor component of the interstage seal for sealing adjacent stages of the LP turbine. The interstage seal also includes a stator component that is coupled to the LP turbine stator vanes. The outer shell supports one or more seal teeth that rotate with respect to the stator component (e.g., an abradable seal member). During operation, the outer shell rotates with respect to the stator component to provide a seal between the seal teeth and the stator component.

In indirect drive LP turbines, the speed of the LP shaft, and, therefore, of the outer shell, becomes so fast that the outer shell is no longer self-supporting, thereby, causing the seal teeth to expand beyond a designed limit and to abrade the stator component at a higher rate than is designed. In this way, current interstage seals wear faster in indirect drive LP turbines due to the higher speeds as compared to interstage seals in direct drive LP turbines. Accordingly, the present disclosure provides for interstage seals having seal disks that extend radially inward from the outer shell.

The seal disk extends radially inward from a free hoop line having a free hoop radius such that the seal disk is disposed within the free hoop radius. The free hoop radius is measured from a centerline axis of the LP turbine to the free hoop line. The free hoop radius is the radius at which a free spinning ring (e.g., the seal teeth of the seals) can no longer support its own centrifugally imposed weight as the free spinning ring rotates. At this combination of rotational speed and radius, the hoop stress becomes large enough to exceed the material strength, usually considered to be about 0.2% yield strength. In high speed LP turbines (e.g . . . indirect drive LP turbines), the free hoop radius is the radius at which the stresses in the material of the seals become so great that the material outside of the free hoop radius (e.g., radially outward) ceases to be self-supporting. The free hoop radius is a function of the type of material of the seals, the speed of the seals, and the temperature of the seals. As the speed or the temperature increases, the free hoop radius decreases and becomes smaller or becomes closer to the centerline axis. As the free hoop radius decreases, the seal has to be made larger to account for the stresses at the high speeds and high temperatures of the seals, thereby, increasing the weight of the LP turbine, and, thus, increasing the weight of the turbine engine.

Accordingly, the present disclosure provides for the interstage seals having a seal disk to provide for additional material radially within the free hoop radius in order to support the seal teeth and the portion of the seal above the free hoop radius. The seal disk helps to reduce stress in the seal teeth, and better controls seal teeth deflection, as compared to seal teeth without the benefit of the seal disk of the present disclosure (e.g., seal teeth that are supported by the adjacent LP rotor disks rather than by a seal disk). In this way, the seal disk helps to increase a lifecycle of the seal teeth, and, therefore, to increase the lifecycle of the interstage seals, in indirect drive LP turbines, as compared to interstage seals in indirect drive LP turbines without the benefit of the present disclosure. The seal disk also enables higher temperatures at the seal teeth, and, therefore, higher speeds of the LP turbine, as compared to seal teeth and LP turbines without the benefit of the present disclosure.

Referring now to the drawings, FIG. 1 is a schematic cross-sectional diagram of a turbine engine 10, taken along a longitudinal centerline axis 12 of the turbine engine 10, according to an embodiment of the present disclosure. As shown in FIG. 1, the turbine engine 10 defines an axial direction A (extending parallel to the longitudinal centerline axis 12 provided for reference) and a radial direction R that is normal to the axial direction A. In general, the turbine engine 10 includes a fan section 14 and a core turbine engine 16 disposed downstream from the fan section 14.

The core turbine engine 16 depicted generally includes an outer casing 18 that is substantially tubular and defines an annular inlet 20. As schematically shown in FIG. 1, the outer casing 18 encases, in serial flow relationship, a compressor section 21 including a booster or a low pressure (LP) compressor 22 followed downstream by a high pressure (HP) compressor 24, a combustion section 26, a turbine section 27 including a high pressure (HP) turbine 28 followed downstream by a low pressure (LP) turbine 30, and a jet exhaust nozzle section 32. A high pressure (HP) shaft 34 or a spool 34 drivingly connects the HP turbine 28 to the HP compressor 24 to rotate the HP turbine 28 and the HP compressor 24 in unison. A low pressure (LP) shaft or spool 36 drivingly connects the LP turbine 30 to the LP compressor 22 to rotate the LP turbine 30 and the LP compressor 22 in unison. The compressor section 21, the combustion section 26, the turbine section 27, and the jet exhaust nozzle section 32 together define a core air flowpath.

For the embodiment depicted in FIG. 1, the fan section 14 includes a fan 38 (e.g., a variable pitch fan) having a plurality of fan blades 40 coupled to a disk 42 in a spaced apart manner. As depicted in FIG. 1, the fan blades 40 extend outwardly from the disk 42 generally along the radial direction R. Each fan blade 40 is rotatable relative to the disk 42 about a pitch axis P by virtue of the fan blades 40 being operatively coupled to an actuation member 44 configured to collectively vary the pitch of the fan blades 40 in unison. The fan blades 40, the disk 42, and the actuation member 44 are together rotatable about the longitudinal centerline axis 12 via a fan shaft 45 that is powered by the LP shaft 36 across a power gearbox, also referred to as a gearbox assembly 46. The gearbox assembly 46 is shown schematically in FIG. 1. The gearbox assembly 46 includes a plurality of gears for adjusting the rotational speed of the fan shaft 45 and, thus, the fan 38 relative to the LP shaft 36. In this way, the turbine engine 10 is an indirect drive turbine engine such that the LP shaft 36 rotates the fan 38 through the gearbox assembly 46 (rather than being directly coupled to the fan 38).

Referring still to the exemplary embodiment of FIG. 1, the disk 42 is covered by a rotatable fan hub 48 aerodynamically contoured to promote an airflow through the plurality of fan blades 40. In addition, the fan section 14 includes an annular fan casing or a nacelle 50 that circumferentially surrounds the fan 38 and/or at least a portion of the core turbine engine 16. The nacelle 50 is supported relative to the core turbine engine 16 by a plurality of circumferentially spaced outlet guide vanes 52. Moreover, a downstream section 54 of the nacelle 50 extends over an outer portion of the core turbine engine 16 to define a bypass airflow passage 56 therebetween.

During operation of the turbine engine 10, a volume of air 58 enters the turbine engine 10 through an inlet 60 of the nacelle 50 and/or the fan section 14. As the volume of air 58 passes across the fan blades 40, a first portion of air 62 is directed or routed into the bypass airflow passage 56, and a second portion of air 64 is directed or is routed into the upstream section of the core air flowpath, or, more specifically, into the annular inlet 20 of the LP compressor 22. The ratio between the first portion of air 62 and the second portion of air 64 is commonly known as a bypass ratio. The pressure of the second portion of air 64 is then increased, forming compressed air 65, and the compressed air 65 is routed through the HP compressor 24 and into the combustion section 26, where the compressed air 65 is mixed with fuel and burned to provide combustion gases 66.

The combustion gases 66 are routed into the HP turbine 28 and expanded through the HP turbine 28 where a portion of thermal and/or of kinetic energy from the combustion gases 66 is extracted via sequential stages of HP turbine stator vanes 68 that are coupled to the outer casing 18 and HP turbine rotor blades 70 that are coupled to the HP shaft 34, thus, causing the HP shaft 34 to rotate, thereby supporting operation of the HP compressor 24. The combustion gases 66 are then routed into the LP turbine 30 and expanded through the LP turbine 30. Here, a second portion of thermal and kinetic energy is extracted from the combustion gases 66 via sequential stages of LP turbine stator vanes 72 that are coupled to the outer casing 18 and LP turbine rotor blades 74 that are coupled to the LP shaft 36, thus, causing the LP shaft 36 to rotate, thereby supporting operation of the LP compressor 22 and rotation of the fan 38 via the gearbox assembly 46.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before being exhausted from a fan nozzle exhaust section 76 of the turbine engine 10, also providing propulsive thrust. The HP turbine 28, the LP turbine 30, and the jet exhaust nozzle section 32 at least partially define a hot gas path 78 for routing the combustion gases 66 through the core turbine engine 16.

The turbine engine 10 depicted in FIG. 1 is by way of example only. In other exemplary embodiments, the turbine engine 10 may have any other suitable configuration. For example, in other exemplary embodiments, the fan 38 may be configured in any other suitable manner (e.g., as a fixed pitch fan) and further may be supported using any other suitable fan frame configuration. Moreover, in other exemplary embodiments, any other suitable number or configuration of compressors, turbines, shafts, or a combination thereof may be provided. In still other exemplary embodiments, aspects of the present disclosure may be incorporated into any other suitable turbine engine, such as, for example, turbofan engines, propfan engines, turbojet engines, turboprop, and/or turboshaft engines.

Figure 2:
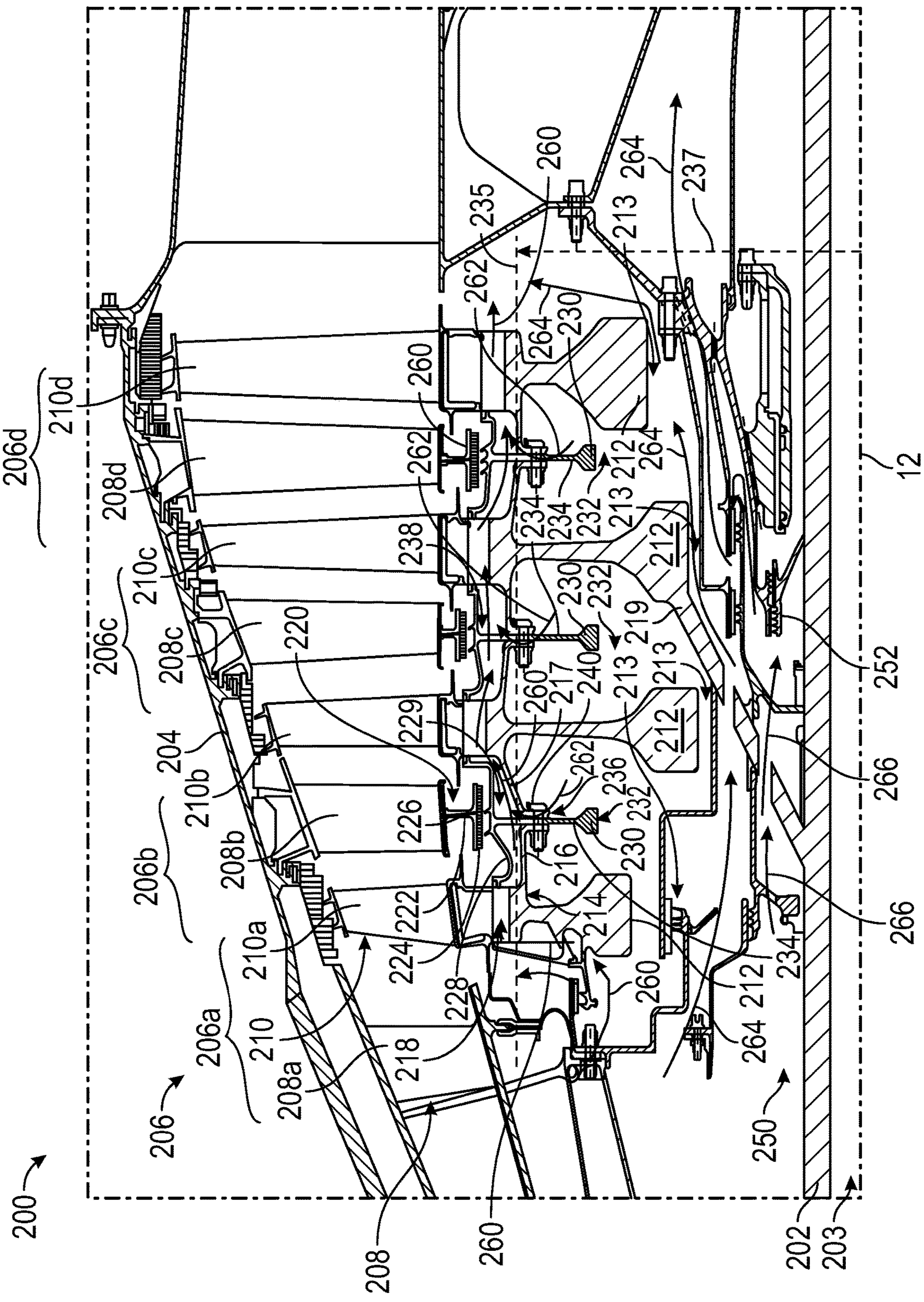
FIG. 2 is an enlarged, schematic, cross-sectional view of a low-pressure (LP) turbine for a turbine engine, taken along the longitudinal centerline axis of the turbine engine, according to the present disclosure.

FIG. 2 is an enlarged, schematic, cross-sectional view of a low-pressure (LP) turbine 200 for a turbine engine, taken along the longitudinal centerline axis 12 of the turbine engine, according to the present disclosure. The LP turbine 200 can be utilized as the LP turbine 30 in the turbine engine 10 of FIG. 1. The LP turbine 200 includes a low-pressure (LP) shaft 202 and an outer casing 204. The LP shaft 202 can be a hollow shaft that includes a hollow interior 203.

The LP turbine 200 includes one or more stages 206 of LP turbine stator vanes 208 and LP turbine rotor blades 210. The LP turbine stator vanes 208 are coupled to the outer casing 204 and do not rotate about the longitudinal centerline axis 12. The LP turbine rotor blades 210 are coupled to the LP shaft 202 and rotate about the longitudinal centerline axis 12. FIG. 2 shows the LP turbine 200 includes four stages 206 including a first stage 206*a*, a second stage 206*b*, a third stage 206*c*, and a fourth stage 206*d*. The LP turbine 200, however, can include any number of stages 206 as desired. The first stage 206*a* includes one or more first LP turbine stator vanes 208*a* and one or more first LP turbine rotor blades 210*a*, the second stage 206*b* includes one or more second LP turbine stator vanes 208*b* and one or more second LP turbine rotor blades 210*b*, the third stage 206*c* includes one or more third LP turbine stator vanes 208*c* and one or more third LP turbine rotor blades 210*c*, and the fourth stage 206*d* includes one or more fourth LP turbine stator vanes 208*d* and one or more fourth LP turbine rotor blades 210*d*.

Each LP turbine rotor blade 210 is coupled at its radially inner end to a rotor disk 212 that is connected to the LP shaft 202. Each rotor disk 212 is annular about the longitudinal centerline axis 12 and defines a rotor disk bore 213. The rotor disk bore 213 includes a rotor disk bore radius measured from the longitudinal centerline axis 12 to a radially inner surface of the rotor disk 212. The rotor disk 212 of each stage 206 is coupled to adjacent rotor disks 212 of adjacent stages 206 by one or more disk extensions, also referred to as an inner shell 214. The inner shell 214 includes a forward disk extension 216 and an aft disk extension 217 that extend from the rotor disk 212 to connect each stage 206 of LP turbine rotor blades 210 together. Each rotor disk 212 includes one or more slots 218. Each LP turbine rotor blade 210 is disposed within a respective slot 218 to couple the LP turbine rotor blade 210 to the rotor disk 212. One or more of the rotor disks 212 are coupled to the LP shaft 202 by one or more connecting shafts 219 such that rotation of the LP shaft 202 rotates the rotor disks 212, thereby rotating the LP turbine rotor blades 210.

The LP turbine 200 also includes one or more interstage seals 220. The one or more interstage seals 220 each includes a seal support ring 222 that extends radially inward from a respective LP turbine stator vane 208. A seal member 224 is coupled to the seal support ring 222. The seal member 224 is annular and includes an abradable seal member that is abraded by one or more seal teeth 226 as the seal teeth 226 rotate with respect to the seal member 224. For example, the seal member 224 includes a honeycomb structure and the one or more seal teeth 226 include labyrinth seal teeth. In this way, the one or more interstage seals 220 are labyrinth seals and provide a sealing arrangement between respective stages 206 of the LP turbine 200. The one or more seal teeth 226 of each interstage seal 220 are coupled to a seal retaining plate, also referred to as an outer shell 228, that extends axially between stages 206 of the LP turbine rotor blades 210. Each outer shell 228 is an annular plate such that the outer shell 228 and the seal teeth 226 are annular about the longitudinal centerline axis 12. Each outer shell 228 is radially outward of the inner shell 214 and an interstage cavity 229 is defined between the outer shell 228 and the inner shell 214. The outer shell 228 is extends axially between, and is coupled to, the rotor disk 212 of adjacent stages 206 of the LP turbine rotor blades 210. In this way, rotation of the LP turbine rotor blades 210 rotates the outer shell 228, thereby rotating the seal teeth 226, as detailed further below.

Each outer shell 228 includes a seal disk 230 that extends radially inward from the outer shell 228. The seal disk 230 of each outer shell 228 is annular about the longitudinal centerline axis 12 and defines a seal disk bore 232. In this way, each interstage seal 220 includes a seal disk 230 having an outer shell 228 and a seal disk bore 232. The seal disk bore 232 includes a seal disk bore radius measured from the longitudinal centerline axis 12 to a radially inner surface of the seal disk 230. The seal disk bore radius is greater than the rotor disk radius. In this way, the seal disk 230 includes less material than the rotor disk 212, and is referred to as a mini disk. The seal disk 230 includes a seal disk flange 234 that extends radially from the seal disk 230 to the outer shell 228 to support the outer shell 228. The seal disk 230 extends radially inward from a free hoop line 235 having a free hoop radius 237. The free hoop radius 237 is measured from the longitudinal centerline axis 12 to the free hoop line 235. The free hoop radius 237 is the radius at which the seal teeth 226 can no longer support its their own centrifugally imposed weight as the seal teeth 226 rotate. At this combination of rotational speed and radius, the hoop stress becomes large enough to exceed the material strength, usually considered to be about 0.2% yield strength. In high speed LP turbines (e.g., indirect drive LP turbines), the free hoop radius 237 is the radius at which the stresses in the material of the seal teeth 226 become so great that the material outside of the free hoop radius 237 (e.g., radially outward) ceases to be self-supporting. The free hoop radius 237 is a function of the type of material of the seal teeth 226 (e.g., a material strength of the seal teeth 226), the speed of the seal teeth 226, and the temperature of the seal teeth 226. As the speed or the temperature increases, the free hoop radius 237 decreases and becomes smaller or becomes closer to the longitudinal centerline axis 12. As the free hoop radius 237 decreases, the seal teeth 226 support has to be made larger to account for the stresses at the high speeds and high temperatures of the seal teeth 226, thereby increasing the weight of the LP turbine 200, and, thus, increasing the weight of the turbine engine 10 (FIG. 1). Accordingly, the present disclosure provides for the interstage seals 220 having a seal disk 230 to provide for additional material radially within the free hoop radius 237 (e.g., radially inward of) in order to support the seal teeth 226 and the portion of the interstage seals 220 outside (e.g., radially outward) of the free hoop radius 237 (e.g., above the free hoop line 235 in FIG. 2). The seal disk 230 helps to reduce stress in the seal teeth 226, and better controls seal teeth 226 deflection, as compared to seal teeth without the benefit of the seal disk 230 of the present disclosure (e.g., seal teeth that are supported by the adjacent LP rotor disks rather than by a seal disk 230). In this way, the seal disk 230 helps to increase a lifecycle of the seal teeth 226, and, therefore, to increase the lifecycle of the interstage seals 220, in indirect drive LP turbines, as compared to interstage seals 220 in indirect drive LP turbines without the benefit of the present disclosure. The seal disk 230 also enables higher temperatures at the seal teeth 226, and, therefore, higher speeds of the LP turbine, as compared to seal teeth and LP turbines without the benefit of the present disclosure. The seal disk bore 232 is disposed radially inward of the free hoop radius 237.

The seal disk 230 includes one or more first seal disk apertures 236 and one or more second seal disk apertures 238 extending therethrough. The one or more first seal disk apertures 236 extend substantially radially through the seal disk 230 such that cooling air passes through the one or more first seal disk apertures 236, as detailed further below. The one or more first seal disk apertures 236 are located on the seal disk flange 234 of the seal disk 230 to provide fluid communication between the seal disk bore 232 and the interstage cavity 229. The one or more second seal disk apertures 238 extend substantially axially through the seal disk 230 such that cooling air passes through the one or more second seal disk apertures 238, as detailed further below. The one or more second seal disk apertures 238 are located on the seal disk flange 234 of the seal disk 230 within the interstage cavity 229 to provide fluid communication between a forward portion of the interstage cavity 229 and an aft portion of the interstage cavity 229. The seal disk 230 is coupled to the inner shell 214, for example, to the forward disk extension 216 and the aft disk extension 217, by one or more fastening mechanisms 240. The one or more fastening mechanisms 240 include bolts, or the like, for coupling and for securing the seal disk 230 to the inner shell 214 such that the seal disk 230 rotates with rotation of the LP turbine rotor blades 210, thereby rotating the seal teeth 226 with respect to the seal member 224.

The LP turbine 200 includes an LP shaft seal assembly 250 that includes one or more LP shaft seals 252 (only one of which is labeled for clarity) for sealing the LP shaft 202 and static components of the LP turbine 200. For example, the LP shaft seal assembly 250 provides for sealing cavities within the LP turbine 200 and to direct cooling air through the LP turbine 200. In this way, the LP shaft seals 252 are placed within the LP turbine 200 to direct the cooling air to various locations of the LP turbine 200, as desired.

In operation, the combustion gases flow through the LP turbine 200 and rotate the LP turbine rotor blades 210, thereby rotating the LP shaft 202, similar to the operation of the turbine engine 10 of FIG. 1. The LP turbine rotor blades 210 rotate the inner shell 214 and the outer shell 228, thereby rotating the seal teeth 226 with respect the seal member 224. In this way, a seal is provided between the stages 206 of the LP turbine rotor blades 210. As the outer shell 228 rotates, a minimal amount of torque is transferred through the outer shell 228. As the inner shell 214 rotates, a majority (e.g., greater than 70%) of the torque is transferred through the inner shell 214 as a primary load path. For example, the torque transferred through the outer shell 228 is greater than zero, but is substantially less than the torque that is transferred through the inner shell 214 (e.g., through the primary load path). In this way, the torque is carried mostly through the inner shell 214 as compared to the outer shell 228. For example, an axial load is applied through the inner shell 214, and there is almost no axial load through the outer shell 228 as the outer shell 228 and the inner shell 214 rotate. The seal disk 230 provides material of the interstage seal 220 within the free hoop radius 237 in order to reduce the amount that the seal teeth 226 expand while the seal teeth 226 rotate in such high speed LP turbines (e.g., indirect drive turbine engines).

During operation, cooling air is operably directed through the LP turbine 200 to cool components of the LP turbine 200. For example, the cooling air can be bleed air from the compressor section 21 (FIG. 1). A first portion of cooling air 260 is operably directed through the one or more slots 218 of each stage 206 of the LP turbine rotor blades 210. The first portion of cooling air 260 is operably directed from the one or more slots 218 into the interstage cavity 229. For example, the first portion of cooling air 260 is operably directed into a forward portion of the interstage cavity 229. The first portion of cooling air 260 is operably directed from the forward portion of the interstage cavity 229 to an aft portion of the interstage cavity 229 through the one or more second seal disk apertures 238. The first portion of cooling air 260 is then operably directed to the one or more slots 218 of the next stage 206, and continues through each stage 206 accordingly.

At the same time, a second portion of cooling air 262 is operably directed from seal disk bore 232 of each stage 206 and into the aft portion of the interstage cavity 229 through the one or more first seal disk apertures 236. The second portion of cooling air 262 mixes with the first portion of cooling air 260 within the interstage cavity 229 of each stage 206, and then is operably directed through the one or more slots 218 of the rotor disk 212 of each stage 206. In this way, the first portion of cooling air 260 and the second portion of cooling air 262 are operably directed through the stages 206 in series from one stage 206 to the next stage 206. In this way, the cooling air helps to cool the interstage cavity 229, thereby cooling the outer shell 228 and the seal teeth 226.

Thus, the cooling air helps to reduce the expansion of the seal teeth 226. The seal disk 230 provides for supporting the outer shell 228 to reduce the expansion of the seal teeth 226 such that less cooling air is needed as compared to interstage seals in indirect drive LP turbines without the benefit of the present disclosure.

The LP shaft seal assembly 250 operably directs a third portion of cooling air 264 and a fourth portion of cooling air 266 through the LP turbine 200. The third portion of cooling air 264 and the fourth portion of cooling air 266 provide cooling in the LP turbine 200 about the LP shaft 202.

The LP turbine 200 is assembled by first mounting the LP turbine stator vanes 208 to the outer casing 204. The LP turbine rotor blades 210 are then mounted within the LP turbine 200. The seal disk 230 is then mounted axially between adjacent stages of LP turbine rotor blades 210. The outer shell 228 is coupled to adjacent stages of the rotor disks 212. The seal disk 230 is coupled to the inner shell 214 by one or more fastening mechanisms 240.

Figure 3:
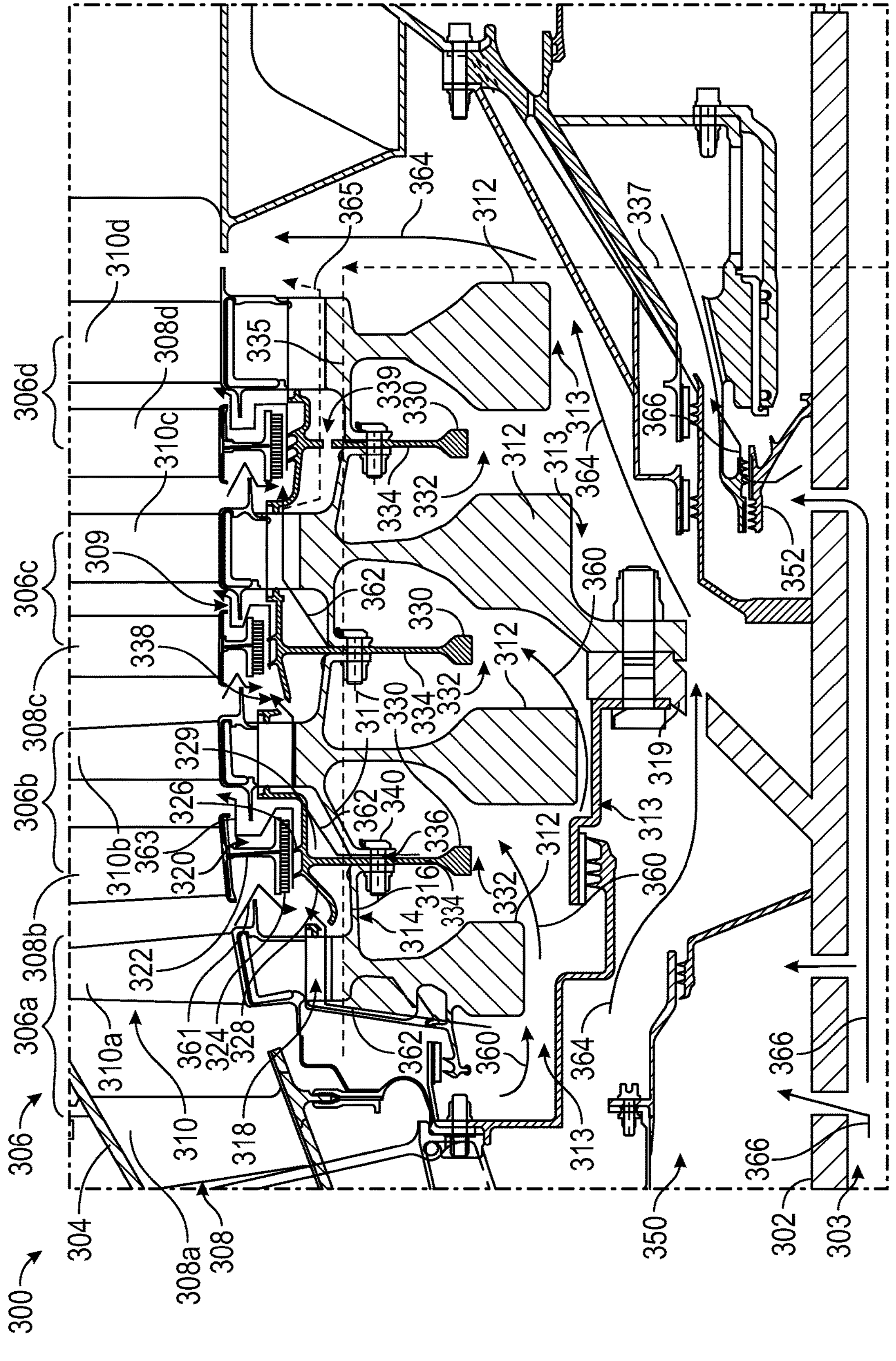
FIG. 3 is an enlarged, schematic, cross-sectional view of a low-pressure (LP) turbine for a turbine engine, taken along the longitudinal centerline axis of the turbine engine, according to another embodiment.

FIG. 3 is an enlarged, schematic, cross-sectional view of a low-pressure (LP) turbine 300 for a turbine engine, taken along the longitudinal centerline axis 12 of the turbine engine, according to another embodiment. The LP turbine 300 can be utilized as the LP turbine 30 in the turbine engine 10 of FIG. 1. The LP turbine 300 is substantially similar to the LP turbine 200 of FIG. 2. For example, the LP turbine 300 includes a low-pressure (LP) shaft 302 and an outer casing 304 (only a portion of which is shown in FIG. 3 for clarity). The LP shaft 302 is a hollow shaft that includes a hollow interior 303.

The LP turbine 300 includes one or more stages 306 of LP turbine stator vanes 308 and LP turbine rotor blades 310. The LP turbine stator vanes 308 are coupled to the outer casing 304 and do not rotate about the longitudinal centerline axis 12. A stator vane cavity 309 is defined radially inward of each LP turbine stator vane 308. The LP turbine rotor blades 310 are coupled to the LP shaft 302 and rotate about the longitudinal centerline axis 12. FIG. 3 shows the LP turbine 300 includes four stages 306 including a first stage **306*a*, a second stage 306*b*, a third stage 306*c*, and a fourth stage 306*d*. The LP turbine 300, however, can include any number of stages 306 as desired. The first stage 306*a* includes one or more first LP turbine stator vanes 308*a* and one or more first LP turbine rotor blades 310*a*, the second stage 306*b* includes one or more second LP turbine stator vanes 308*b* and one or more second LP turbine rotor blades 310*b*, the third stage 306*c* includes one or more third LP turbine stator vanes 308*c* and one or more third LP turbine rotor blades 310*c*, and the fourth stage 306*d* includes one or more fourth LP turbine stator vanes 308*d* and one or more fourth LP turbine rotor blades 310*d***.

Each LP turbine rotor blade 310 is coupled at its radially inner end to a rotor disk 312 that is connected to the LP shaft 302. Each rotor disk 312 is annular about the longitudinal centerline axis 12 and defines a rotor disk bore 313. The rotor disk bore 313 includes a rotor disk bore radius measured from the longitudinal centerline axis 12 to a radially inner surface of the rotor disk 312. The rotor disk 312 of each stage 306 is coupled to adjacent rotor disks 312 of adjacent stages 306 by one or more disk extensions, also referred to as an inner shell 314. The inner shell 314 includes a forward disk extension 316 and an aft disk extension 317 that extend from the rotor disk 312 to connect each stage 306 of LP turbine rotor blades 310 together. Each rotor disk 312 includes one or more slots 318. Each LP turbine rotor blade 310 is disposed within a respective slot 318 to couple the LP turbine rotor blade 310 to the rotor disk 312. One or more of the disks 312 are coupled to the LP shaft 302 by one or more connecting shafts 319 such that rotation of the LP shaft 302 rotates the disks 312, thereby rotating the LP turbine rotor blades 310.

The LP turbine 300 also includes one or more interstage seals 320. The one or more interstage seals 320 each includes a seal support ring 322 that extends radially inward from a respective LP turbine stator vane 308. A seal member 324 is coupled to the seal support ring 322. The seal member 324 is annular and includes an abradable seal member that is abraded by one or more seal teeth 326 as the seal teeth 326 rotate with respect to the seal member 324. For example, the seal member 324 includes a honeycomb structure and the one or more seal teeth 326 include labyrinth seal teeth. In this way, the one or more interstage seals 320 are labyrinth seals and provide a sealing arrangement between respective stages 306 of the LP turbine 300. The one or more seal teeth 326 of each interstage seal 320 are formed on a seal retaining plate, also referred to as an outer shell 328, that extends axially between stages 306 of the LP turbine rotor blades 310. Each outer shell 328 is an annular plate such that the outer shell 328 and the seal teeth 326 are annular about the longitudinal centerline axis 12. Each outer shell 328 is radially outward of the inner shell 314 and an interstage cavity 329 is defined between the outer shell 328 and the inner shell 314. The outer shell 328 is extends axially between, and is coupled to, the rotor disk 312 of adjacent stages 306 of the LP turbine rotor blades 310. In this way, rotation of the LP turbine rotor blades 310 rotates the outer shell 328, thereby rotating the seal teeth 326, as detailed further below.

Each outer shell 328 includes a seal disk 330 that extends radially inward from the outer shell 328. The seal disk 330 of each outer shell 328 is annular about the longitudinal centerline axis 12 and defines a seal disk bore 332. In this way, each interstage seal 320 includes a seal disk 330 having an outer shell 328 and a seal disk bore 332. The seal disk bore 332 includes a seal disk bore radius measured from the longitudinal centerline axis 12 to a radially inner surface of the seal disk 330. The seal disk bore radius is greater than the rotor disk radius. The seal disk 330 includes a seal disk flange 334 that extends radially from the seal disk 330 to the outer shell 328 to support the outer shell 328. The seal disk 330 extends radially inward from a free hoop line 335 having a free hoop radius 337. The free hoop radius 337 is measured from the longitudinal centerline axis 12 to the free hoop line 335. Similar to the LP turbine 200 of FIG. 2, the present disclosure provides for the interstage seals 320 having a seal disk 330 to support the seal teeth 326 and the portion of the interstage seals 320 radially outward of the free hoop radius 337.

The seal disk 330 includes one or more first seal disk apertures 336 and the outer shell 328 includes one or more second seal disk apertures 338 extending therethrough. The one or more first seal disk apertures 336 extend substantially radially through the seal disk 330 such that cooling air passes through the one or more first seal disk apertures 336, as detailed further below. The one or more first seal disk apertures 336 are located on the seal disk flange 334 of the seal disk 330 to provide fluid communication between the seal disk bore 332 and the interstage cavity 329. The one or more second seal disk apertures 338 extend substantially radially through the outer shell 328 such that cooling air passes through the one or more second seal disk apertures 338, as detailed further below. The one or more second seal disk apertures 338 are located on the outer shell 328 to provide fluid communication between the interstage cavity 329 and the stator vane cavity 309. The seal disk 330 is coupled to the inner shell 314, for example, to the forward disk extension 316 and the aft disk extension 317, by one or more fastening mechanisms 340. The one or more fastening mechanisms 340 include bolts, or the like, for coupling and for securing the seal disk 330 to the inner shell 314 such that the seal disk 330 rotates with rotation of the LP turbine rotor blades 310, thereby rotating the seal teeth 326 with respect to the seal member 324.

The LP turbine 300 includes an LP shaft seal assembly 350 that includes one or more LP shaft seals 352 (only one of which is labeled for clarity) for sealing the LP shaft 302 and static components of the LP turbine 300. For example, the LP shaft seal assembly 350 provides for sealing cavities within the LP turbine 300 and to direct cooling air through the LP turbine 300. In this way, the LP shaft seals 352 are placed within the LP turbine 300 to direct the cooling air to various locations of the LP turbine 300, as desired.

In operation, the combustion gases flow through the LP turbine 300 and rotate the LP turbine rotor blades 310, thereby rotating the LP shaft 302, similar to the operation of the turbine engine 10 of FIG. 1. The LP turbine rotor blades 310 rotate the inner shell 314 and the outer shell 328, thereby rotating the seal teeth 326 with respect the seal member 324. In this way, a seal is provided between the stages 306 of the LP turbine rotor blades 310. As the outer shell 328 and the inner shell 314 rotate, a minimal amount of torque is transferred through the outer shell 328, and a majority (e.g., greater than 70%) of the torque is transferred through the inner shell 314, as detailed above. In this way, an axial load is applied through the inner shell 314, and there is almost no axial load through the outer shell 328. The seal disk 330 provides material of the interstage seal 320 within the free hoop radius 337 in order to reduce the amount that the seal teeth 326 expand while the seal teeth 326 rotate in such high speed LP turbines (e.g., indirect drive turbine engines).

During operation, cooling air is operably directed through the LP turbine 300 to cool components of the LP turbine 300. For example, the cooling air can be bleed air from the compressor section 21 (FIG. 1). A first portion of cooling air 360 is operably directed through the rotor disk bores 313. The first portion of cooling air is split into a second portion of cooling air 362 and the second portion of cooling air 362 is operably directed through the one or more first seal disk apertures 336 and into the interstage cavity 329. The second portion of cooling air 362 is then operably directed through the one or more slots 318 of each stage 306 of the LP turbine rotor blades 310 and is operably directed through the one or more second seal disk apertures 338 and into the stator vane cavity 309. For example, the second portion of cooling air 360 is operably directed into an aft portion of the interstage cavity 329, then through the one or more slots 318, into a forward portion of the next interstage cavity 329. The last stage 306 (e.g., the fourth stage 306*d*) includes one or more third seal disk apertures 339 that extend axially through the seal disk flange 334 within the interstage cavity 329 to provide fluid communication from a forward portion of the interstage cavity 329 to an aft portion of the interstage cavity 329. In this way, a third portion of cooling air 365 is operably directed through the one or more third seal disk apertures 339 of the last stage 306 such that the third portion of cooling air 365 exits the last stage 306.

At the same time, hot air 361 is operably directed through the stator vane cavity 309. The second portion of cooling air 362 mixes with the hot air 361 generating mixed air 363 within a forward portion of the stator vane cavity 309 of each stage 306. The mixed air 363 is then operably directed across the one or more seal teeth 326 and out of the stator vane cavity 309. In this way, the first portion of cooling air 360 and the second portion of cooling air 362 are operably directed through the stages 306 in series from one stage 306 to the next stage 306. In this way, the cooling air helps to cool the interstage cavity 329, thereby cooling the outer shell 328 and the seal teeth 326. Thus, the cooling air helps to reduce the expansion of the seal teeth 326. The seal disk 330 provides for supporting the outer shell 328 to reduce the expansion of the seal teeth 326 such that less cooling air is needed as compared to interstage seals in indirect drive LP turbines without the benefit of the present disclosure.

The LP shaft seal assembly 350 operably directs a fourth portion of cooling air 364 and a fifth portion of cooling air 366 through the LP turbine 300. The fourth portion of cooling air 364 and the fifth portion of cooling air 366 provide cooling in the LP turbine 300 about the LP shaft 302. The fifth portion of cooling air 366 is operably directed through the hollow interior 303 of the LP shaft 302 to provide cooling air to various portions of the LP shaft 302.

The LP turbine 300 is assembled by first mounting the LP turbine stator vanes 308 to the outer casing 304. The LP turbine rotor blades 310 are then mounted within the LP turbine 300. The seal disk 330 is then mounted axially between adjacent stages of LP turbine rotor blades 310. The outer shell 328 is coupled to adjacent stages of the rotor disks 312. The seal disk 330 is coupled to the inner shell 314 by one or more fastening mechanisms 340.

The present disclosure provides for seal disks 230, 330 such that the outer shell 228, 328 is self-supporting. For example, the seal disks 230, 330 support the seal teeth 226, 326 and the portion of the interstage seals 220, 320 radially outward of the free hoop radius 237, 337. Accordingly, the seal disks 230, 330 of the present disclosure help to reduce an amount of extension of the seal teeth 226, 326 (e.g., reduce an amount of stress in the seal teeth 226, 326) during operation, thereby increasing a lifecycle of the interstage seals 220, 320, and increasing a lifecycle of the LP turbine 200, 300.

Further aspects are provided by the subject matter of the following clauses.

A low-pressure (LP) turbine comprises an LP shaft, one or more stages of LP turbine stator vanes and LP turbine rotor blades, the LP turbine rotor blades being coupled to, and rotating with, the LP shaft, and one or more interstage seals disposed between the one or more stages, the one or more interstage seals each comprising a seal disk that extends radially inward of the LP turbine stator vanes, each seal disk including an outer shell that supports one or more seal teeth, the outer shell rotating as the LP shaft rotates.

The LP turbine of the preceding clause, the interstage seals including a free hoop radius that is defined from a centerline axis of the LP turbine, the seal disk extending radially within the free hoop radius.

The LP turbine of any preceding clause, the LP shaft being coupled to a gearbox assembly.

The LP turbine of any preceding clause, the seal disk defining a seal disk bore therethrough, the seal disk bore being disposed radially within the free hoop radius.

The LP turbine of any preceding clause, the LP turbine rotor blades being each mounted on a rotor disk, the rotor disk defining a rotor disk bore therethrough.

The LP turbine of any preceding clause, the seal disk being coupled to the rotor disk of adjacent stages of the LP turbine rotor blades.

The LP turbine of any preceding clause, the seal disk bore including a seal disk bore radius and the rotor disk bore includes a rotor disk bore radius, the seal disk bore radius being greater than the rotor disk bore radius.

The LP turbine of any preceding clause, further comprising an inner shell that couples the rotor disk of each stage of the one or more stages to an adjacent rotor disk of an adjacent stage of the one or more stages.

The LP turbine of any preceding clause, the inner shell being located radially inward of the outer shell, and the inner shell and the outer shell define an interstage cavity therebetween.

The LP turbine of any preceding clause, the seal disk including one or more seal disk apertures extending through the seal disk, cooling air being operably directed into the interstage cavity through the one or more seal disk apertures.

The LP turbine of any preceding clause, the gearbox assembly comprising one or more gears for reducing a speed from the LP shaft to the fan shaft.

The LP turbine of any preceding clause, the LP shaft including a hollow interior.

The LP turbine of any preceding clause, further comprising an outer casing, the LP turbine stator vanes being coupled to the outer casing.

The LP turbine of any preceding clause, the inner shell including a forward disk extension and an aft disk extension.

The LP turbine of any preceding clause, the rotor disk of each stage including one or more slots.

The LP turbine of any preceding clause, the LP turbine rotor blades being disposed within the one or more slots.

The LP turbine of any preceding clause, the LP turbine rotor blades being coupled to the LP shaft by one or more connecting shafts.

The LP turbine of any preceding clause, the one or more interstage seals each including a seal support ring extending radially inward form a respective LP turbine stator vane.

The LP turbine of any preceding clause, the one or more interstage seals further comprising a seal member coupled to the seal support ring.

The LP turbine of any preceding clause, the seal member being an abradable seal member.

The LP turbine of any preceding clause, the one or more interstage seals being labyrinth seals.

The LP turbine of any preceding clause, the one or more seal teeth being annular.

The LP turbine of any preceding clause, the outer shell being an annular plate.

The LP turbine of any preceding clause, the free hoop radius being a function of a material of the seal disk, a speed of the seal disk, and a temperature of the seal disk.

The LP turbine of any preceding clause, the seal disk including one or more first seal disk apertures that extend substantially radially through the seal disk to provide fluid communication from the seal disk bore to the interstage cavity, cooling air being operably directed from the seal disk bore into the interstage cavity through the one or more first seal disk apertures.

The LP turbine of any preceding clause, the seal disk including a seal disk flange extending radially inward from the outer shell, the one or more first seal disk apertures being located on the seal disk flange to provide fluid communication between the seal disk bore and the interstage cavity.

The LP turbine of any preceding clause, the seal disk including one or more second seal disk apertures that extend through the seal disk.

The LP turbine of any preceding clause, the one or more second seal disk apertures extending substantially axially through the seal disk to provide fluid communication between a forward portion of the interstage cavity and an aft portion of the interstage cavity, cooling air being operably directed from the forward portion to the aft portion through the one or more second seal disk apertures.

The LP turbine of any preceding clause, the seal disk being coupled to the inner shell by one or more fastening mechanisms.

The LP turbine of any preceding clause, further including an LP shaft seal assembly including one or more LP shaft seals.

The LP turbine of any preceding clause, torque being transferred through the inner shell as the LP turbine rotor blades rotate.

The LP turbine of any preceding clause, a majority of the torque being transferred through the inner shell as compared to the torque transferred through the outer shell.

The LP turbine of any preceding clause, a first portion of cooling air being operably directed through the one or more slots of each stage of the LP turbine rotor blades, and into the forward portion of the interstage cavity.

The LP turbine of any preceding clause, the first portion of cooling air being operably directed from the forward portion of the interstage cavity, through the one or more second seal disk apertures, and into the aft portion of the interstage cavity.

The LP turbine of any preceding clause, the first portion of cooling air being operably directed through the one or more slots of the next stage.

The LP turbine of any preceding clause, a second portion of cooling air being operably directed from the seal disk bore of each stage and into the aft portion of the interstage cavity through the one or more first seal disk apertures.

The LP turbine of any preceding clause, the LP shaft seal assembly operably directing a third portion of cooling air through the LP turbine about the LP shaft.

The LP turbine of any preceding clause, the LP shaft seal assembly operably directing a fourth portion of cooling air through the LP turbine about the LP shaft.

The LP turbine of any preceding clause, a first portion of cooling air being operably directed from the seal disk bore to the aft portion of the interstage cavity through the one or more first seal disk apertures.

The LP turbine of any preceding clause, the one or more second seal disk apertures extending substantially radially through the outer shell in the forward portion of the interstage cavity.

The LP turbine of any preceding clause, the one or more second seal disk apertures operably directing the second portion of cooling air from the forward portion of the interstage cavity into a stator vane cavity.

The LP turbine of any preceding clause, the second portion of cooling air mixing with hot air in the stator vane cavity.

The LP turbine of any preceding clause, further comprising one or more third seal disk apertures extending substantially axially through the seal disk within the interstage cavity in a last stage of the LP turbine.

The LP turbine of any preceding clause, a third portion of cooling air being operably directed through the one or more third seal disk apertures from the forward portion of the interstage cavity to the aft portion of interstage cavity.

The LP turbine of any preceding clause, the LP shaft seal assembly operably directing a fourth portion of cooling air through the LP turbine about the LP shaft.

The LP turbine of any preceding clause, the LP shaft seal assembly operably directing a fifth portion of cooling air through the hollow interior of the LP shaft.

A turbine engine comprises a fan, a low-pressure (LP) shaft coupled to the fan, and an LP turbine comprising one or more stages of LP turbine stator vanes and LP turbine rotor blades, the LP turbine rotor blades being coupled to, and rotating with, the LP shaft, and one or more interstage seals disposed between the one or more stages, the one or more interstage seals each comprising a seal disk that extends radially inward of the LP turbine stator vanes, each seal disk including an outer shell that supports one or more seal teeth, the outer shell rotating as the LP shaft rotates.

The turbine engine of the preceding clause, the interstage seals including a free hoop radius that is defined from a centerline axis of the LP turbine, the seal disk extending radially within the free hoop radius.

The turbine engine of any preceding clause, further comprising a gearbox assembly, the fan being coupled to the LP shaft through the gearbox assembly.

The turbine engine of any preceding clause, the seal disk defining a seal disk bore therethrough, the seal disk bore being disposed radially within the free hoop radius.

The turbine engine of any preceding clause, the LP turbine rotor blades being each mounted on a rotor disk, the rotor disk defining a rotor disk bore therethrough.

The turbine engine of any preceding clause, the seal disk being coupled to the rotor disk of adjacent stages of the LP turbine rotor blades.

The turbine engine of any preceding clause, the seal disk bore including a seal disk bore radius and the rotor disk bore includes a rotor disk bore radius, the seal disk bore radius being greater than the rotor disk bore radius.

The turbine engine of any preceding clause, further comprising an inner shell that couples the rotor disk of each stage of the one or more stages to an adjacent rotor disk of an adjacent stage of the one or more stages.

The turbine engine of any preceding clause, the inner shell being located radially inward of the outer shell, and the inner shell and the outer shell define an interstage cavity therebetween.

The turbine engine of any preceding clause, the seal disk including one or more seal disk apertures extending through the seal disk, cooling air being operably directed into the interstage cavity through the one or more seal disk apertures.

The turbine engine of any preceding clause, further comprising a high pressure (HP) turbine coupled to an HP shaft.

The turbine engine of any preceding clause, further comprising an LP compressor coupled to the LP shaft.

The turbine engine of any preceding clause, further comprising an HP compressor coupled to the HP shaft.

The turbine engine of any preceding clause, the gearbox assembly comprising one or more gears for reducing a speed from the LP shaft to the fan shaft.

The turbine engine of any preceding clause, the LP shaft including a hollow interior.

The turbine engine of any preceding clause, further comprising an outer casing, the LP turbine stator vanes being coupled to the outer casing.

The turbine engine of any preceding clause, the inner shell including a forward disk extension and an aft disk extension.

The turbine engine of any preceding clause, the rotor disk of each stage including one or more slots.

The turbine engine of any preceding clause, the LP turbine rotor blades being disposed within the one or more slots.

The LP turbine of any preceding clause, the LP turbine rotor blades being coupled to the LP shaft by one or more connecting shafts.

The turbine engine of any preceding clause, the one or more interstage seals each including a seal support ring extending radially inward form a respective LP turbine stator vane.

The turbine engine of any preceding clause, the one or more interstage seals further comprising a seal member coupled to the seal support ring.

The turbine engine of any preceding clause, the seal member being an abradable seal member.

The turbine engine of any preceding clause, the one or more interstage seals being labyrinth seals.

The turbine engine of any preceding clause, the one or more seal teeth being annular.

The turbine engine of any preceding clause, the outer shell being an annular plate.

The turbine engine of any preceding clause, the free hoop radius being a function of a material of the seal disk, a speed of the seal disk, and a temperature of the seal disk.

The LP turbine of any preceding clause, the seal disk including one or more first seal disk apertures that extend substantially radially through the seal disk.

The turbine engine of any preceding clause, the seal disk including a seal disk flange extending radially inward from the outer shell, the one or more first seal disk apertures being located on the seal disk flange to provide fluid communication between the seal disk bore and the interstage cavity.

The turbine engine of any preceding clause, the seal disk including one or more second seal disk apertures that extend through the seal disk.

The turbine engine of any preceding clause, the one or more second seal disk apertures extending substantially axially through the seal disk to provide fluid communication between a forward portion of the interstage cavity and an aft portion of the interstage cavity.

The turbine engine of any preceding clause, the seal disk being coupled to the inner shell by one or more fastening mechanisms.

The turbine engine of any preceding clause, further including an LP shaft seal assembly including one or more LP shaft seals.

The turbine engine of any preceding clause, torque being transferred through the inner shell as the LP turbine rotor blades rotate.

The turbine engine of any preceding clause, a majority of the torque being transferred through the inner shell as compared to the torque transferred through the outer shell.

The turbine engine of any preceding clause, a first portion of cooling air being operably directed through the one or more slots of each stage of the LP turbine rotor blades, and into the forward portion of the interstage cavity.

The turbine engine of any preceding clause, the first portion of cooling air being operably directed from the forward portion of the interstage cavity, through the one or more second seal disk apertures, and into the aft portion of the interstage cavity.

The turbine engine of any preceding clause, the first portion of cooling air being operably directed through the one or more slots of the next stage.

The turbine engine of any preceding clause, a second portion of cooling air being operably directed from the seal disk bore of each stage and into the aft portion of the interstage cavity through the one or more first seal disk apertures.

The turbine engine of any preceding clause, the LP shaft seal assembly operably directing a third portion of cooling air through the LP turbine about the LP shaft.

The turbine engine of any preceding clause, the LP shaft seal assembly operably directing a fourth portion of cooling air through the LP turbine about the LP shaft.

The turbine engine of any preceding clause, a first portion of cooling air being operably directed from the seal disk bore to the aft portion of the interstage cavity through the one or more first seal disk apertures.

The LP turbine of any preceding clause, the one or more second seal disk apertures extending substantially radially through the outer shell in the forward portion of the interstage cavity.

The turbine engine of any preceding clause, the one or more second seal disk apertures operably directing the second portion of cooling air from the forward portion of the interstage cavity into a stator vane cavity.

The turbine engine of any preceding clause, the second portion of cooling air mixing with hot air in the stator vane cavity.

The turbine engine of any preceding clause, further comprising one or more third seal disk apertures extending substantially axially through the seal disk within the interstage cavity in a last stage of the LP turbine.

The turbine engine of any preceding clause, a third portion of cooling air being operably directed through the one or more third seal disk apertures from the forward portion of the interstage cavity to the aft portion of interstage cavity.

The turbine engine of any preceding clause, the LP shaft seal assembly operably directing a fourth portion of cooling air through the LP turbine about the LP shaft.

The turbine engine of any preceding clause, the LP shaft seal assembly operably directing a fifth portion of cooling air through a hollow interior of the LP shaft.

A method of operating a low-pressure (LP) turbine, the LP turbine being the LP turbine of any preceding clause, the method comprising operating the LP turbine to rotate the LP turbine rotor blades, and rotating the outer shell and the seal disk.

The method of the preceding clause, further comprising transferring torque through the inner shell.

The method of any preceding clause, further comprising transferring a majority of the torque through the inner shell as compared to the torque transferred through the outer shell.

The method of any preceding clause, further comprising operably directing a first portion of cooling air through the one or more slots of each stage of the LP turbine rotor blades, and into the forward portion of the interstage cavity.

The method of any preceding clause, further comprising operably directing the first portion of cooling air from the forward portion of the interstage cavity, through the one or more second seal disk apertures, and into the aft portion of the interstage cavity.

The method of any preceding clause, further comprising operably directing the first portion of cooling air through the one or more slots of the next stage.

The method of any preceding clause, further comprising operably directing a second portion of cooling air from the seal disk bore of each stage and into the aft portion of the interstage cavity through the one or more first seal disk apertures.

The method of any preceding clause, further comprising operably directing a third portion of cooling air through LP turbine about the LP shaft.

The method of any preceding clause, further comprising operably directing a fourth portion of cooling air through the LP turbine about the LP shaft.

The method of any preceding clause, further comprising operably directing a first portion of cooling air from the seal disk bore to the aft portion of the interstage cavity through the one or more first seal disk apertures.

The method of any preceding clause, further comprising operably directing a second portion of cooling air through the one or more second seal disk apertures from the forward portion of the interstage cavity into a stator vane cavity.

The method of any preceding clause, further comprising operably mixing the second portion of cooling air with hot air in the stator vane cavity.

The method of any preceding clause, further comprising operably directing a third portion of cooling air through the one or more third seal disk apertures from the forward portion of the interstage cavity to the aft portion of interstage cavity.

The method of any preceding clause, further comprising operably directing a fourth portion of cooling air through the LP turbine about the LP shaft.

The method of any preceding clause, further comprising operably directing a fifth portion of cooling air through the LP turbine about the LP shaft.

A method of assembling a low-pressure (LP) turbine, the LP turbine being the LP turbine of any preceding clause, the method comprising mounting the LP turbine stator vanes to the outer casing, mounting the LP turbine rotor blades within the LP turbine, mounting the seal disk axially between adjacent stages of the LP turbine rotor blades, coupling the outer shell to adjacent stages of the rotor disks, and coupling the seal disk to the inner shell by one or more fastening mechanisms.

Although the foregoing description is directed to the preferred embodiments of the present disclosure, other variations and modifications will be apparent to those skilled in the art and may be made without departing from the spirit or the scope of the disclosure. Moreover, features described in connection with one embodiment of the present disclosure may be used in conjunction with other embodiments, even if not explicitly stated above.

The invention claimed is:

1. A low-pressure (LP) turbine comprising:

an LP shaft;

a plurality of stages of LP turbine stator vanes and LP turbine rotor blades, the LP turbine rotor blades being coupled to, and rotating with, the LP shaft; and one or more interstage seals disposed between the plurality of stages, the one or more interstage seals each comprising:

an outer shell that supports one or more seal teeth, the outer shell extending axially between, and connected to, a stage of the plurality of stages and an adjacent stage of the plurality of stages, the outer shell rotating as the LP shaft rotates;

an inner shell that couples a stage of the plurality of stages to an adjacent stage of the plurality of stages, the inner shell being positioned radially inward of the outer shell;

a seal disk that is disposed radially inward of the inner shell; and a seal disk flange that extends radially from the seal disk to the outer shell to support the outer shell, the seal disk flange being integral with the seal disk and the outer shell, and the seal disk having an axial length that is greater than an axial length than the seal disk flange.

2. The LP turbine of claim 1, wherein the interstage seals include a free hoop radius that is defined from a longitudinal centerline axis of the LP turbine, the seal disk extending radially within the free hoop radius.

3. The LP turbine of claim 2, wherein the seal disk defines a seal disk bore therethrough, the seal disk bore being disposed radially within the free hoop radius.

4. The LP turbine of claim 3, wherein the LP turbine rotor blades are each mounted on a rotor disk, the rotor disk defining a rotor disk bore therethrough.

5. The LP turbine of claim 4, wherein the seal disk is coupled to the rotor disk of adjacent stages of the LP turbine rotor blades.

6. The LP turbine of claim 4, wherein the seal disk bore includes a seal disk bore radius and the rotor disk bore includes a rotor disk bore radius, the seal disk bore radius being greater than the rotor disk bore radius.

7. The LP turbine of claim 4, wherein the inner shell couples the rotor disk of the stage of the plurality of stages to an adjacent rotor disk of the adjacent stage of the plurality of stages.

8. The LP turbine of claim 7, wherein the inner shell and the outer shell define an interstage cavity therebetween.

9. The LP turbine of claim 8, wherein the seal disk includes one or more seal disk apertures extending through the seal disk, cooling air being operably directed into the interstage cavity through the one or more seal disk apertures.

10. The LP turbine of claim 1, wherein the LP shaft is coupled to a gearbox assembly.

11. A turbine engine comprising:

a fan;

a low-pressure (LP) shaft coupled to the fan; and an LP turbine comprising:

a plurality of stages of LP turbine stator vanes and LP turbine rotor blades, the LP turbine rotor blades being coupled to, and rotating with, the LP shaft; and one or more interstage seals disposed between the plurality of stages, the one or more interstage seals each comprising:

an outer shell that supports one or more seal teeth, the outer shell extending axially between, and connected to, a stage of the plurality of stages and an adjacent stage of the plurality of stages, the outer shell rotating as the LP shaft rotates;

an inner shell that couples a stage of the plurality of stages to an adjacent stage of the plurality of stages, the inner shell being positioned radially inward of the outer shell;

a seal disk that is disposed radially inward of the inner shell; and a seal disk flange that extends radially from the seal disk to the outer shell to support the outer shell, the seal disk flange being integral with the seal disk and the outer shell, and the seal disk having an axial length that is greater than an axial length than the seal disk flange.

12. The turbine engine of claim 11, wherein the interstage seals include a free hoop radius that is defined from a centerline axis of the LP turbine, the seal disk extending radially within the free hoop radius.

13. The turbine engine of claim 11, further comprising a gearbox assembly, the fan being coupled to the LP shaft through the gearbox assembly.

14. The turbine engine of claim 11, wherein the seal disk defines a seal disk bore therethrough, the seal disk bore being disposed radially within the free hoop radius.

15. The turbine engine of claim 14, wherein the LP turbine rotor blades are each mounted on a rotor disk, the rotor disk defining a rotor disk bore therethrough.

16. The turbine engine of claim 15, wherein the seal disk is coupled to the rotor disk of adjacent stages of the LP turbine rotor blades.

17. The turbine engine of claim 15, wherein the seal disk bore includes a seal disk bore radius and the rotor disk bore includes a rotor disk bore radius, the seal disk bore radius being greater than the rotor disk bore radius.

18. The turbine engine of claim 15, wherein the inner shell couples the rotor disk of the stage of the plurality of stages to an adjacent rotor disk of the adjacent stage of the plurality of stages.

19. The turbine engine of claim 18, wherein the inner shell and the outer shell define an interstage cavity therebetween.

20. The turbine engine of claim 19, wherein the seal disk includes one or more seal disk apertures extending through the seal disk, cooling air being operably directed into the interstage cavity through the one or more seal disk apertures.

* * * * *